May 15, 1962 N. F. LUNSMAN 3,034,247
ICE FISHING DEVICE
Filed April 19, 1960
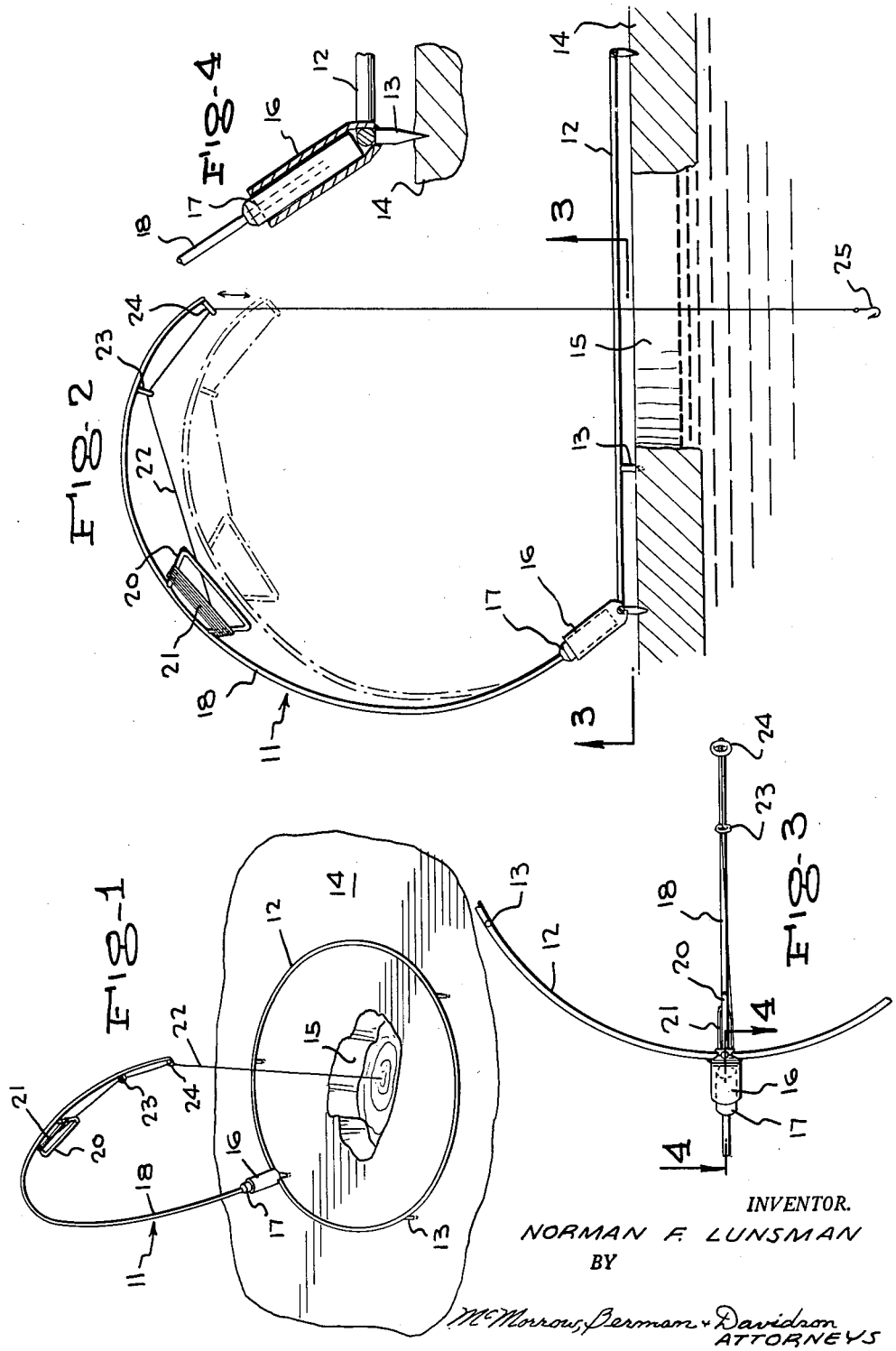
INVENTOR.
NORMAN F. LUNSMAN
BY
McMorrow, Berman & Davidson
ATTORNEYS 3,034,247
ICE FISHING DEVICE
Norman F. Lunsman, 286 Van Buren Ave.,
St. Paul 3, Minn.
Filed Apr. 19, 1960, Ser. No. 23,245
1 Claim. (Cl. 43—21.2)

This invention relates to fishing apparatus, and more particularly to a device adapted to be employed adjacent to a hole in the ice for fishing therethrough and to provide a visual signal responsive to the engagement of a fish with a fishing line attached to the device.

A main object of the invention is to provide a novel and improved ice fishing device which is simple in construction, which is easy to set up for use adjacent to a hole in the ice for fishing therethrough, and which provides a clearly visible signal responsive to a pull on the fishing line associated with the device.

A further object of the invention is to provide an improved ice fishing device which is relatively inexpensive to manufacture, which is sturdy in construction, which is easy to take apart for transportation and storage, and which provides a stable and secure support for a fishing line engaged through a hole in the ice and which furthermore provides an unmistakable visual signal responsive to a pull on the fishing line.

Further objects and advantages of the invention will become apparent from the following description and claim and from the accompanying drawings, wherein:

FIGURE 1 is a perspective view showing an improved device according to the present invention shown set up for use.

FIGURE 2 is an enlarged vertical cross sectional view taken through the portion of the ice on which the device of FIGURE 1 is mounted and illustrating the manner in which the upstanding flexible rod element of the device is deflected downwardly responsive to a pull exerted on the associated fishing line.

FIGURE 3 is a horizontal cross sectional view taken on the line 3—3 of FIGURE 2.

FIGURE 4 is an enlarged cross sectional detail view taken on the line 4—4 of FIGURE 3.

Referring to the drawings, the ice fishing device is designated generally at 11 and comprises a rigid circular ring member 12 of suitable rod material, the ring 12 being provided with the spaced depending sharpened anchor pins 13 adapted to be engaged in the surface of the ice 14 around an ice fishing hole 15 to prevent the ring member 12 from shifting from its desired position.

Rigidly secured to the ring member 12 is an upwardly and outwardly inclined sleeve-like rigid socket 16 in which is received the supporting base portion 17 of a flexible, arcuate, generally semi-circular fishing line-supporting rod 18 which may be thus positioned in overlying relationship to the ring member 12.

The enlarged supporting base member 17 is of elongated shape and is generally cylindrical, so as to slidably engage in the socket 16, and to be readily removable therefrom when it is desired to disassemble the device for transportation or storage.

Rigidly secured to the intermediate portion of the arcuately curved flexible rod member 18 and directed inwardly is a rigid loop element 20 of downwardly flaring shape, as shown in FIGURE 2, adapted to support the excess turns 21 of a fishing line 22 in the manner illustrated in FIGURE 2. Thus, the excess turns 21 of the line may be wrapped around the loop 20, as shown. The fishing line 22 extends slidably through a pair of spaced guide loops 23 and 24 secured to the free end portion of the flexible rod member 18, the end guide loop 24 being preferably located at the tip of the rod member 18, as illustrated.

In using the device, the ring member 12 is placed around the hole 15 and the flexible rod 18 is mounted in the socket 16 by engaging the supporting base 17 of the rod in said socket in the manner above described. The fishing line is engaged through the guide loops 23 and 24, the excess turns of the line being wrapped around the loop member 20. The fishing line thus extends into the hole 15 in the manner shown in FIGURE 2. When a fish engages the hook 25 attached to the end of the fishing line, the fish pulls on the line and thus causes the rod element 18 to flex downwardly in the manner shown in dotted view in FIGURE 2, the pulling action providing a succession of flexural movements of the rod elements 18, which provides a visual signal that a fish has become engaged with the hook 25.

While a specific embodiment of an improved ice fishing device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

An ice fishing device comprising a substantially circular rigid ring member of sufficient size to be disposed around a hole in the ice, a plurality of spaced depending sharpened anchoring pins rigidly secured to said ring member, an upwardly and outwardly inclined sleeve-like socket member rigidly secured to said ring member, a flexible generally semi-circular fishing line supporting rod, a cylindrical base portion on one end of said supporting rod slidably engaged in said socket member, whereby to support the rod in an upstanding position extending over the ring member, a rigid loop element of downwardly flaring shape rigidly secured to the intermediate portion of the supporting rod and directed inwardly, a pair of spaced inwardly directed guide loops on the rod adjacent its free end, and a fishing line wound on said rigid loop element and engaged through said guide loops, the free end of the rod being located substantially over the center of the rigid ring member.

References Cited in the file of this patent
UNITED STATES PATENTS

| | | |
|---|---|---|
| 2,554,927 | Schultz | May 29, 1951 |
| 2,924,038 | Dahlgren | Feb. 9, 1960 |

FOREIGN PATENTS

| | | |
|---|---|---|
| 206,395 | Australia | Feb. 8, 1957 |